US008401223B2

(12) United States Patent
Abeloe

(10) Patent No.: US 8,401,223 B2
(45) Date of Patent: Mar. 19, 2013

(54) EMBEDDING AND DECODING THREE-DIMENSIONAL WATERMARKS INTO STEREOSCOPIC IMAGES

(75) Inventor: Kenneth A. Abeloe, Carlsbad, CA (US)

(73) Assignee: Virginia Venture Industries, LLC, Centreville, VA (US)

( * ) Notice: Subject to any disclaimer, the term of this patent is extended or adjusted under 35 U.S.C. 154(b) by 750 days.

(21) Appl. No.: 12/581,424

(22) Filed: Oct. 19, 2009

(65) Prior Publication Data

US 2010/0098326 A1    Apr. 22, 2010

Related U.S. Application Data

(60) Provisional application No. 61/106,894, filed on Oct. 20, 2008.

(51) Int. Cl.
*G06K 9/00*   (2006.01)
(52) U.S. Cl. ........... 382/100; 382/154; 348/42; 345/419
(58) Field of Classification Search .................. 382/100, 382/154; 348/42; 345/419
See application file for complete search history.

(56) References Cited

U.S. PATENT DOCUMENTS

| | | | |
|---|---|---|---|
| 6,546,113 B1* | 4/2003 | Lucas et al. .................... | 382/100 |
| 7,697,609 B2* | 4/2010 | Ryou ........................ | 375/240.16 |
| 7,706,025 B2* | 4/2010 | Wang ........................... | 358/3.28 |
| 2010/0026783 A1* | 2/2010 | Chiu et al. ...................... | 348/43 |

OTHER PUBLICATIONS

Coltuc "On Stereo Embedding by Reversible Watermarking" Jul. 2007, IEEE, ISSCS 2007, 1-4.*
Smolic et al., "Coding Algorithms for 3DTV-A Survey", Nov. 2007, IEEE, Trans on Circuits and Systems for Video Technology, vol. 17, issue 11, 1606-1621.*
Chiang et al., "Data Hiding Using Binocular Fusion of Stereo Pairs", 1998, Proc. of Eighth National Conf. in Information Security, 245-254.*
Andersen, Cohan, "Behind the Scenes of a Next-Gen 3D Film", PC Magazine, Jun. 18, 2008.
Cowan, Matt, Chief Scientific Officer, REAL D, Chairman, DC28-40 Stereoscopic Digital Cinema, "3D Standards".
Cowan, Matt, Chief Scientific Officer, REAL D, "REAL D 3D Theatrical System—A Technical Overview", Dec. 5, 2007.
Fritz et al., "Disney unveils animation slate", Variety Magazine, Apr. 8, 2008.
McBride, Sarah, "RealD Deal Will Bring 3D to Small-Theater", Technology, Sep. 2, 2008.

* cited by examiner

*Primary Examiner* — Claire X Wang
*Assistant Examiner* — Katrina Fujita
(74) *Attorney, Agent, or Firm* — Knobbe, Martens, Olson & Bear, LLP

(57) ABSTRACT

Disclosed inventions relates to methods and systems for encoding at least one watermark into a stereoscopic conjugate pair of images. An example method comprises the step of encoding the at least one watermark by shifting selected pixels of said pair of images in one or more directions. The one or more directions include a horizontal direction. In the disclosed embodiments, ancillary information is not required to support decoding of encoded watermarks in addition to the transmitted left and right images.

9 Claims, 9 Drawing Sheets

Prior Art
Figure 1a
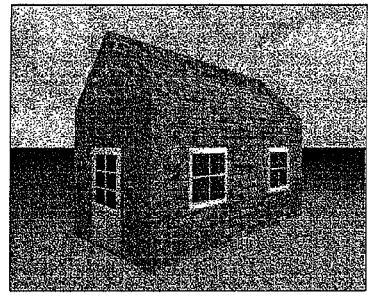
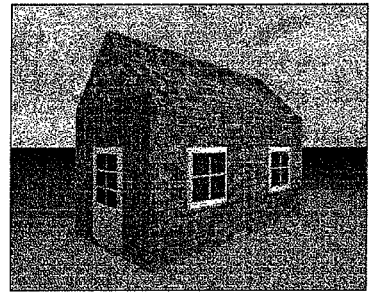
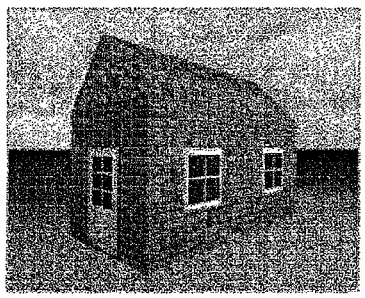

Prior Art
Figure 2
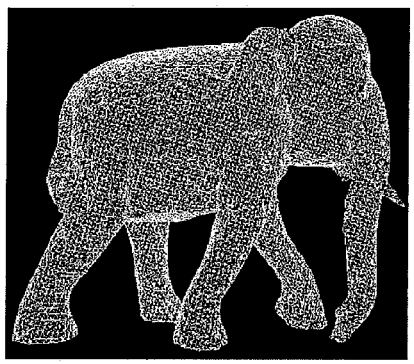 201
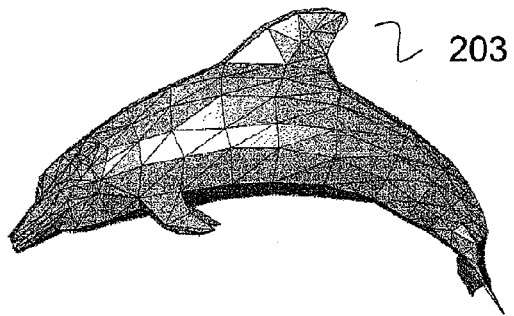 203

Figure 5

| 501 | 503 | 507 | 505 |
|---|---|---|---|
| 1 | 8 | 7 | 1 |
| 0 | 9 | 8 | 0 |
| 1 | 5 | 5 | 1 |
| 0 | 3 | 2 | 0 |
| 1 | 2 | 1 | 1 |
| 1 | 1 | 1 | 1 |
| 1 | 2 | 1 | 1 |
| 0 | 3 | 3 | 0 |
| 0 | 2 | 2 | 0 |
| 0 | 1 | 2 | 0 |
| 0 | 2 | 2 | 0 |

EMBEDDING AND DECODING THREE-DIMENSIONAL WATERMARKS INTO STEREOSCOPIC IMAGES

RELATED APPLICATIONS

This application claims the benefit of U.S. Provisional No. 61/106,894, filed Oct. 20, 2008, which is incorporated by reference herein in its entirety.

BACKGROUND OF THE INVENTION

1. Field of the Invention

Embodiments described herein include methods and systems of embedding and decoding three-dimensional watermarks in stereoscopic images.

2. Description of the Related Art

FIG. 1a illustrates a conventional stereoscopic conjugate pair of images. Two images illustrated therein represent the right 101 and left 103 images for a viewer. A viewer wearing a special set of glasses such as the glasses with red-green filters would perceive a 3D image. It should be noted, however, that the red-green filters are included herein only as an example, and other known mechanisms can be employed such as linearly and/or spherically polarized glasses as used within the Real 3D Cinema or Disney Digital 3D systems. Known 3D technologies are described in detail, such as, "3D Standards", Matt Cowan, Chief Scientific Officer, REAL 3D, Chairman, DC28-40 Stereoscopic Digital Cinema, and "REAL D 3D Theatrical System—A Technical Overview", Matt Cowan, Chief Scientific Officer, REAL 3D, both of which are incorporated by reference herein in their entirety.

Although only one set of images is represented, many 3D scenes can be collected together and made into a movie. Such a 3D movie that has been digitized will be referred to as three dimensional (3D) video. Example featured movies include "Journey to the Center of the Earth," and future feature movies include Pixar offerings to include the Toy Story and Cars series. More descriptions of three dimensional movies can be found in "RealD Deal Will Bring 3D To Small Theater Screens", Sarah McBride, Wall Street Journal, Sep. 2, 2008. "Behind the Scenes of a Next Gen 3D Film," Cohan Andersen, PC Magazine, Jun. 18, 2008, and "Disney unveils animation slate," Ben Fritz, Dade Hayes, Variety Magazine, Apr. 8, 2008, all of which are incorporated by reference herein in their entirety.

It should be noted that a 3D effect in 3D images is achieved by shifting pixels in the horizontal direction, along the viewer's eye direction (i.e., x-parallax) to create the illusion of depth in the image scenes. That is, some parts of the 3D image appearing nearer to the viewer while some other parts of the images appearing farther from the viewer. The fused effect creates a perceived 3D depth. This perceived depth is characterized by a depth map 107 shown in FIG. 1b, in which lighter colored portions represent those that appear closer to the viewer compared with darker colored portions. More detailed description of depth map is provided in U.S. Pat. No. 6,215,898, which is incorporated herein its entirety.

FIG. 2 illustrates example watermarks that can be encoded into 3D images. In conventional watermarking methods, watermarks, such as shown in FIG. 2, are encoded into lower bits of color information of 3D images. Although these conventional methods handle 3D object watermarking, these methods' primary focus on the primitive level (e.g. vertices, surfaces) where an object model (e.g. 3D wireframe model) is assumed prior to 3D transmission. The illustrated examples show a watermark 201 created by adjusting three dimensional mesh, and another watermark 203 created by adjusting textures associated with three dimensional model. For such conventional methods, the encoded object's model is necessary in order to decode the watermark.

SUMMARY OF THE INVENTION

Embodiments of the disclosed invention relate to methods, systems, and apparatuses for encoding at least one watermark into a conventional stereoscopic conjugate pair of images. For instance, the method comprises the step of encoding the at least one watermark by shifting selected pixels of said pair of images in one or more directions. The one or more directions include a horizontal direction.

In the disclosed embodiments, ancillary information is not required to support decoding of encoded watermarks in addition to the transmitted left and right images. It should be noted that, herein, the terms embedding watermark(s) is used interchangeable with encoding watermark(s).

In certain embodiments of the present invention, the step of encoding the at least one watermark comprises generating a depth map in a digital format, encoding the at least one watermark into the depth map, thereby generating a encoded depth map, and generating a modified stereoscopic conjugate pair of images based on said encoded depth map and the conventional stereoscopic conjugate pair of images. The step of encoding the at least one watermark may comprise the step of encoding said at least one watermark into one or more least significant bits of said depth map.

Some disclosed embodiments also include the step of encoding at least one of said at least one watermark into each of quadrant of at least one stereo image pair. Various embodiments may also include encoding the at least one watermark into a selected image pairs of a 3D movie.

In other example embodiments, a method for decoding at least one watermark from a 3D pair of images that has been encoded with at least one watermark. Embodiments may also include the steps of generating a depth map from the 3D pair of images, receiving information regarding an encoding algorithm that encoded said at least one watermark into said 3D pair of images, and decoding said at least one watermark from said depth map using a decoding algorithm based on said encoding algorithm.

Some example embodiments may also include the steps of modifying said depth map by removing said watermark information from the said depth map, and generating a modified set of 3D pair of images based on the modified depth map. Embodiments can also include the steps of receiving a code from a remote location, matching the code to the at least one watermark, and performing an action based on a result of the matching step.

In some embodiments, the action is preventing the 3D video from being played when the result is a negative match, or the action is reporting to a second remote location when the result is a negative match. The remote location is a database of pass-codes.

Various embodiments of present invention can also be implemented on a processor or processors (e.g., digital signal processors, microprocessors, or the like) coupled to a memory or memories.

BRIEF DESCRIPTION OF THE DRAWINGS

A more complete appreciation of embodiments of the invention, and many of the attendant advantages thereof, will be readily apparent as the same becomes better understood by reference to the following detailed description when considered in conjunction with the accompanying drawing, wherein:

FIG. 1a is an illustration of a conventional stereoscopic pair of images;

FIG. 2 is an illustration of conventional watermarks in 3D scenes;

FIG. 5 is an illustration of the steps of embedding and then decoding processes using numerical examples in accordance with various embodiments of the present invention;

It should be noted that a same reference numeral in different figures indicate the same or similar featured functions or items depending on the context.

DESCRIPTION OF VARIOUS EMBODIMENTS OF THE PRESENT INVENTION

To overcome some of the shortcomings described above, in the present invention, ancillary information, for example, is not required to support decoding of encoded watermarks in addition to the transmitted left and right images. It should be noted that, herein, the terms embedding watermark(s) is used interchangeably with encoding watermark(s).

Figure 1B:
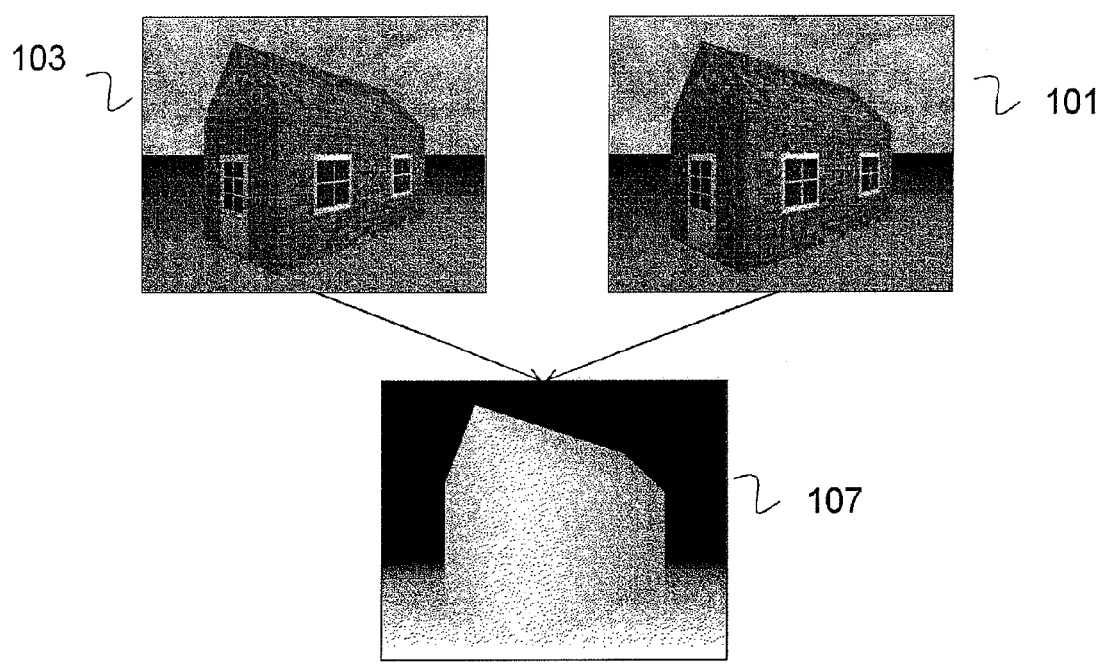
FIG. 1b is an illustration of conventional depth map derived from a stereoscopic pair of images.
Figure 3:
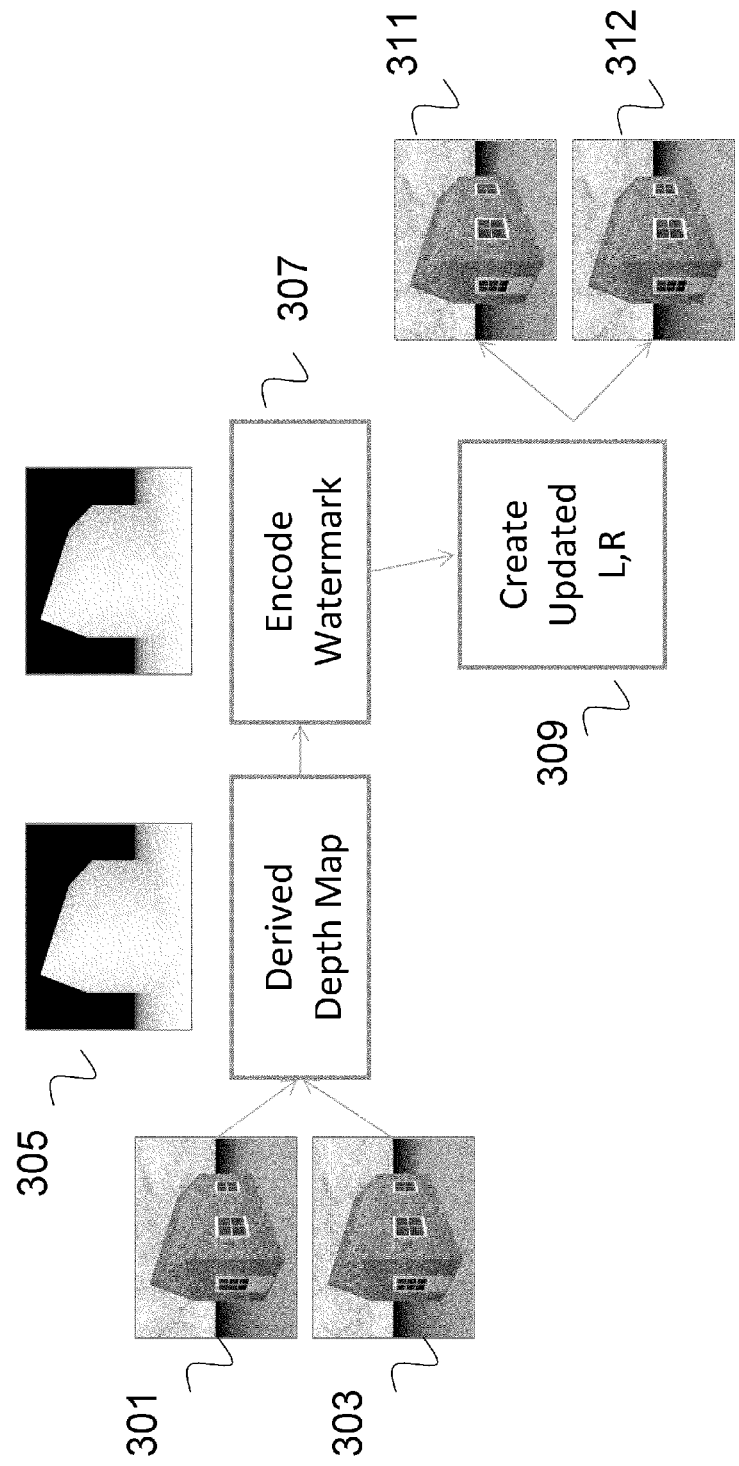
FIG. 3 is a flow chart illustrating steps of encoding water marks in accordance with various embodiments of the present invention.

FIG. 3 illustrates example steps of encoding watermarks to 3D images in accordance with various embodiments of the present invention by translating selected pixels in the horizontal and/or vertical directions. In other words, in addition to the pixels being shifted in the original 3D video data to achieve the 3D effect, additional shifting of selected pixels encodes the watermark onto the derived depth map. Because the human eyes are oriented along a horizontal axis, depth is perceived through different perspectives along a horizontal axis. At a minimum, 2 images must be transmitted—one for the left eye and one for the right eye to create a three dimensional scene. Although not inclusive all methodologies to encode the watermark, the following steps provide an example process.

1. Within a video stream, select the target image pair (left 301, right 303).

2. Within an image set, determine the true left and right correspondences between images. These correspondences are generally reported as x shifts between the two images, which is captured as a derived depth map 305.

3. The watermark payload is encoded within these shifts to encode a watermark 307. As an example, the encoded payload can be a serial number, a public key, or a record within a database.

4. Then create updated left and right images 309. In other words, shifts are generated within the left 311 and right 312 images. These images are then transmitted.

It is important to note that the shifts can be generated from the left or right image and the shifts are generally taken in the horizontal direction to be consistent the human eye's frame of reference. This approach is invariant to various image compression techniques and is non-destructive to the original colors in the video signal. The following computer program, written in Java and compiled using Java Development Kit Version 1.4, illustrates the encoding process in more detail.

```
package vvi.encoders.mpeg2.watermark.*;
/**
 * Filename: DWMEmbedMethod.java
 *
 * This method reads an MPEG-2 file (as an example), encodes a
 * digital watermark, and transmits MPEG-2.
 *
 * For purposes of example, it is assumed that frame[i] is left eye
 * and frame[i+1] is right eye where the display is handled by the
 * stereo application device (e.g. TV, video machine, etc.).
 *
 * Kenneth A. Abeloe - Virginia Venture Industries, LLC
 *
 **/
import java.io.IOException;
import java.util.Properties;
import org.apache.log4j.PropertyConfigurator;
public class DWMEmbed {
    public static org.apache.log4j.Logger mLog =
                     org.apache.log4j.Logger.getLogger(DWMEmbedMethod.class);
    private DigitalWaterMark dwm;
    // Constructor
    public DWMEmbed(String inputMark, int inFrameRate) {
            // Initialize the Digital Watermark for the Embed Functionality
            dwm = new DigitalWaterMark(inputMark, inFrameRate);
            // Iniitialize the event logger
            initializeLogger( );
    }
    // Initialize the logger
    private void initializeLogger( ) {
      Properties logProperties = new Properties( );
      try {
```

```
            logProperties.load(new FileInputStream("log4j.properties"));
            PropertyConfigurator.configure(logProperties);
            mLog.info("Logging initialized.");
        }
        catch(IOException e) {
            throw new RuntimeException("Unable to load logging property file",e);
        }
    }
    // Method: Embed Watermark into Video Stream
    public boolean embedWatermark(String inputFileName, String outputFilename) {
        try {
                // Allocate input data streams
                VideoInputStream vin = new VideoInputStream(inputFileName);
                VideoOutputStream vout = new VideoOutputStream(outputFileName);
                // Log values
                mLog.info("!!! Starting video stream encoding.");
                // Get properties of video
                VideoProperties vp = new VideoProperties(inputFileName);
                int numLines = vp.getNumLines( );
                int numSamples = vp.getNumSamples( );
                int numColors = vp.getNumColors( );
                // Allocate 2 images - 1 left and 1 right to hold collected video image
                byte[ ][ ] leftImage = new byte[numLines * numSamples][numColors];
                byte[ ][ ] rightImage = new byte[numLines * numSamples][numColors];
                // Pull a left, right image out of the video stream, calculate depth map,
                // embed watermark,
                int index = 0;
                while (vin.play( ) == true) {
                    // Grab frames at DWM frame rate specification
                    if ((index % dwm.getFrameRate( )) == 0) {
                        // Grab frame from image
                        // returns numLines * numSamples * numColors
                        leftImage = vin.getPixels(index);
                        rightImage = vin.getPixels(index+1);
                        // Determine depth map
                        byte[ ] depthMap = new byte[numLines * numSamples];
                        for (int i = 0; i < numLines; i++) {
                            for (j = 0; j < numSamples; j++) {
                                // Determine depth for current position;
                                int pos = i * numSamples + j;
                                depth [pos]         =         findDepth(leftImage[pos], rightImage[pos]);
                            }
                        }
                        // Use depth map information to update left / right image
                        // with watermark
                        leftImage = dwm.updateImage(depth);
                        rightImage = dwm.updateImage(depth);
                        // Update the video with loaded left and right images.
                        vout.createFrame(leftImage, index);
                        vout.createFrame(rightImage, index+1);
                    } else {
                        // Frame is not of interest based on frame rate sampling
                        // Update output video with input video only
                        vout.createFrame(vin.getPixels(index);
                        vout.createFrame(vin.getPixels(index+1);
                    }
                } //end of while
                // Write out the video file name
                vout.write( );
                vout.flush( );
        } // end of try
        // Catch any exceptions to the software
        catch(Exception e) {
        mLog.error("Caught exception in DWMEmbed: ",e.toString( ));
        return false;
        }
        return true;
    }
    public static void main(String[ ] args) {
            // Digital Watermark Specifics
            int inFrameRate = (int)(new Integer(args[0]).toInt( ));
            // Example String Watermark
            String inDigitalMark = new String(args[1]);
            // Input and Output Filenames
            String inFile = new String(args[2]);
            String outFile = new String(args[3]);
            DWMEbed embedder = new DWMEbed(inFrameRate, inDigitalMark);
            boolean status = embedder(inFile, outFile);
            if (status) {
```

```
                mLog.info("Completed video embedding for the following file: " + inFile);
                mLog.info("Completed output video is titled: " + outFile);
            } else {
                mLog.error("Errors processing the following input file: " + inFile);
            }
        }
    }
}
```

Figure 4:
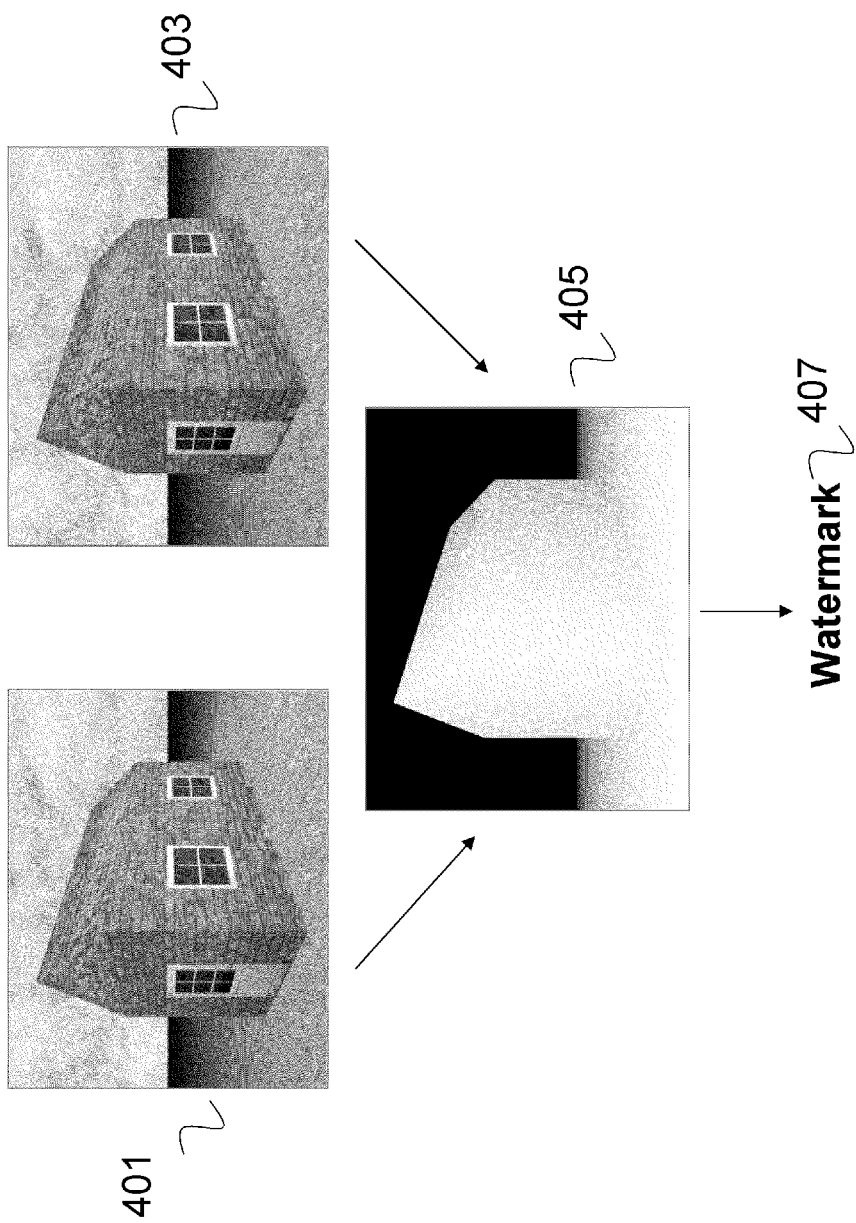
FIG. 4 is an illustration of deriving a watermark from a depth map in accordance with various embodiments of the present invention.

FIG. 4 illustrates the steps of extracting the encoded watermark from the stereoscopic pair with an encoded watermark in accordance with various embodiments of the present invention. In particular, a decoder, which could be part of an apparatus such as a TV, a movie player (e.g., DVDs, high definition DVD such as Blu-Ray Disc players), or a stereoscopic video player, receives the 3D video signal. The signal is first separated into individual image pairs prior to viewing through various methods such as the following:

1. Pixel interleaved—every other pixel belongs to the current view. For example pixel[i] belongs to left view and pixel [i+1] belongs to right view.

2. Line interleaved—every other line belongs to the current view. For example pixel[i] through pixel[i+numSamples] belongs to the left view while pixel[i+numSamples+1] belongs to the right view.

3. Scene interleaved—every other image belongs to the current view.

It should be noted that all image pairs could be encoded with watermarks or only selected image pairs can be encoded with watermarks. In reference to FIG. 4, for the image pairs (e.g., left image 401 and right image 403) with encoded watermarks, the depth map 405 is derived. From the derived depth map, the encoded watermark 407 is extracted. The following computer program, written in Java and compiled using the Java Development Kit Version 1.4, illustrates the encoding process in more detail. package vvi.encoders.mpeg2.watermark.*;

```java
/**
 * Filename: DWMDecodeMethod.java
 *
 * This method reads an MPEG-2 file (as an example), decodes the
 * digital watermark and updates a log file with results.
 *
 * For purposes of example, it is assumed that frame[i] is left eye
 * and frame[i+1] is right eye where the display is handled by the
 * stereo application device (e.g. TV, video machine, etc.).
 *
 * Kenneth A. Abeloe - Virginia Venture Industries, LLC
 *
 **/
import java.io.IOException;
import java.util.Properties;
import org.apache.log4j.PropertyConfigurator;
public class DWMDecode {
    public static org.apache.log4j.Logger mLog =
                        org.apache.log4j.Logger.getLogger(DWMEmbedMethod.class);
    private DigitalWaterMark dwm;
    // Constructor
    public DWMDecode(int inFrameRate) {
            // Initialize the Digital Watermark for the Decode Functionality
            dwm = new DigitalWaterMark(null, inFrameRate);
            // Initialize the event logger
            initializeLogger( );
    }
    // Initialize the logger
    private void initializeLogger( ) {
        Properties logProperties = new Properties( );
        try{
            logProperties.load(new FileInputStream("log4j.properties"));
            PropertyConfigurator.configure(logProperties);
            mLog.info("Logging initialized.");
        }
        catch(IOException e) {
            throw new RuntimeException("Unable to load logging property file",e);
        }
    }
    // Method: Decode Watermark from Video Stream
    public boolean decodeWatermark(String inputFileName) {
            try{
                    // Allocate input data streams
                    VideoInputStream vin = new VideoInputStream(inputFileName);
                    // Log values
                    mLog.info("!!! Starting video stream decoding.");
                    // Get properties of video
                    VideoProperties vp = new VideoProperties(inputFileName);
```

```
                int numLines = vp.getNumLines( );
                int numSamples = vp.getNumSamples( );
                int numColors = vp.getNumColors( );
                // Allocate 2 images - 1 left and 1 right to hold collected video image
                byte[ ][ ] leftImage = new byte[numLines * numSamples][numColors];
                byte[ ][ ] rightImage = new byte[numLines * numSamples][numColors];
                // Pull a left, right image out of the video stream, calculate depth map,
                // embed watermark,
                int index = 0;
                while (vin.play( ) == true) {
                    // Grab frames at DWM frame rate specification
                    if ((index % dwm.getFrameRate( )) == 0) {
                        // Grab frame from image
                        // returns numLines * numSamples * numColors
                        leftImage = vin.getPixels(index);
                        rightImage = vin.getPixels(index+1);
                        // Determine depth map
                        byte[ ] depthMap = new byte[numLines * numSamples];
                        for (int i = 0; i < numLines; i++) {
                            for (j = 0; j < numSamples; j++) {
                                // Determine depth for current position;
                                int pos = i * numSamples + j;
                                depth[pos]        =        findDepth(leftImage[pos],
rightImage[pos]);
                            }
                        }
                        // Use depth map information to determine digital mark
                        if (dwm.decodeMark(depth)) {
                            mLog.info("Watermark Determined to be: " + dwm.toString( ));
                        } else {
                            mLog.error("Error determining watermark for index: " +
index);
                        }                           }
                } // end of while
            } //end of try
            // Catch any exceptions to the software
            catch(Exception e) {
            mLog.error("Caught exception in DWMEmbed: ",e.toString( ));
            return false;
        }
        return true;
    }
    public static void main(String[ ] args) {
            // Digital Watermark Specifics
            int inFrameRate = (int)(new Integer(args[0]).toInt( ));
            DWMDecode decoder = new DWMDecode(inFrameRate);
            boolean status = decoder(inFile);
            if (status) {
                    mLog.info("Completed video decoding for the following file: " + inFile);
            } else {
                    mLog.error("Errors processing the following input file: " + inFile);
            }
    }
}
```

Various embodiments of the present invention can include both encoding and decoding function. The following explains an example process for adding watermark information into the depth map for a particular set of images (left, right) within a 3D video. In this example, the digital watermark to be encoded is a string to be encoded multiple times in the 3D scene.

1. The string is encoded into a binary format. FIG. 5 illustrates an example binary string to encode 501. As another example, a part of the string "elephant" can be encoded in the binary representation of the following: 011001 0101101100011001010111000001101000011000010110111001110100

2. The depth map from a pair of stereo images (not yet embedded with a watermark) is derived by correlating features along the horizontal direction (or x direction) between left and right. For example purposes only, for every pixel in the left image, search along the x-direction for pixel correspondence (e.g. through correlation) in the right image. FIG. 5 show a part of an example depth map 503.

The following computer program, written in Java and compiled using Java Development Kit Version 1.4, illustrates the encoding process in more detail.

```
short[ ] depthMap = new short[TotalLines][TotalSamples];
// Loop through all lines and samples of the image
for (int i = 0; i < TotalLines; i++) {
    for (int j = 0; j < TotalSamples; j++) {
        Initialize the local variables.
        double matchResult;
        double maxResult = 0.0;
        // Chip the left image (reference image)
        tstLeftImage = chipImage(i, j, 20, 20, leftImage);
        // Search a window of values in the X direction
        for (k = j-20; k <= j+20; k++) {
            try{
                // Chip various right images (test images)
                tstRightImage = chipImage(i, k, 20, 20, rightImage);
                // Correlate the images together
                matchResult = correlateImages(tstLeftImage,
```

```
            tstRightImage);
            // Use maxResult to indntify the best match
            if (matchResult > maxResult) {
                maxResult = matchResult;
                resultIndex = k;
            }
        }
        // Catch any reading exceptions (e.g. borders) and keep
        going.
        catch (Exception e) {
            continue;
        }
    }
    // Delta difference between left and right image
    depthMap[i][j] = k - j;
    }
}
```

3. As an example, the string is encoded by examining and regenerating the depth map using the binary encoded string. As shown by a string 505 in FIG. 5, a binary string representing one line of a watermark can be encoded using an odd/even scheme within the depth map. Even numbers in the depth map register to a binary value "0" and odd numbers in the depth map register to a binary value "1". As shown by a string 507 in FIG. 5, the depth map is adjusted to support the encoded string. This process is repeated multiple times to help defeat tampering attempts on the processed video.

Figure 6:
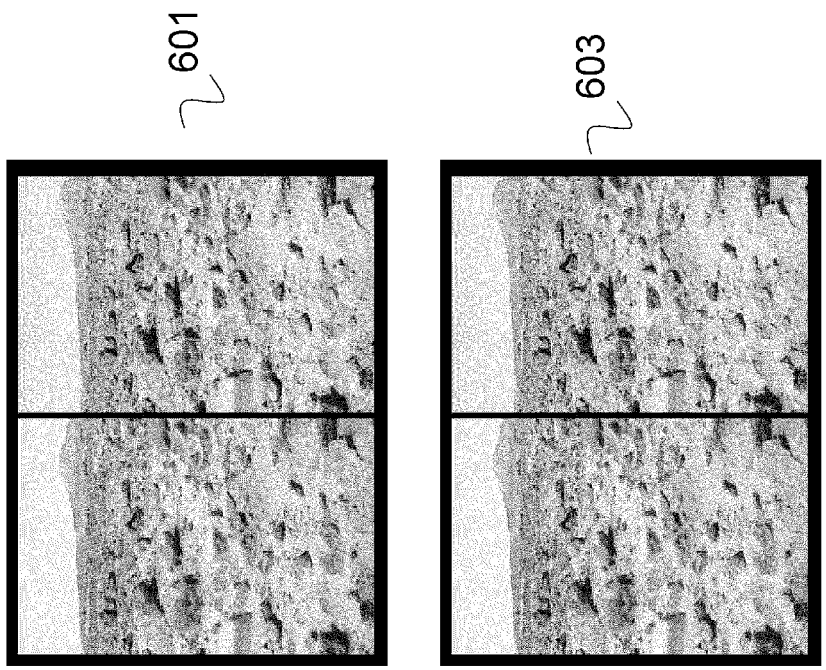
FIG. 6 is an illustration of example stereoscopic images generated in accordance with various embodiments of the present invention.

4. After the depth map has been adjusted to encode the value of the watermark, the depth values are translated back to the original image in the forms of depth shifts in the image as shown in FIG. 6, in which 601 is a representative stereo image pair without a digital watermark, 603 is a representative stereo image pair with a digital watermark. In this example, in 603, an example "elephant" string has been embedded.

In this example, the digital watermark to be extracted is a string to be decoded from the 3D scene.

1. The depth map is derived by correlating features along the horizontal direction (or x direction) between left and right. For example purposes only, for every pixel in the left image, search along the x-direction for pixel correspondence (e.g. through correlation) in the right image (as shown above).

2. The depth values are analyzed for their odd/even values and either translated into a binary 0 for even numbers or a binary 1 for odd numbers (see string 505 in FIG. 5). Because multiple digital watermarks may have been introduced into the depth map, special characters (e.g., 00000000) may be introduced to break up the multiple watermarks.

3. Once the binary string is determined, the string is converted into ASCII and transmitted for verification processes.

Figure 7:
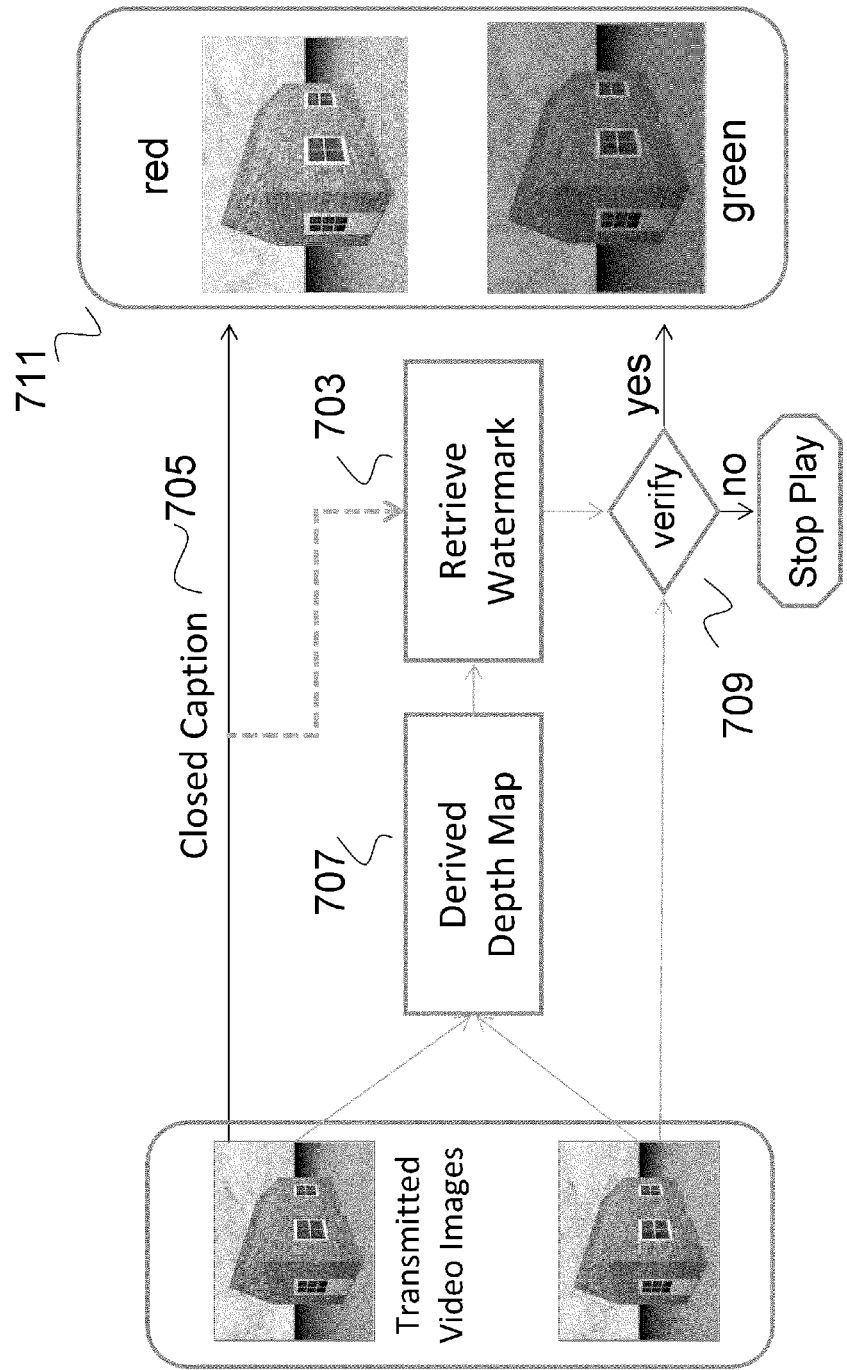
FIG. 7 is a flow chart illustrating an example verifying processing chain in accordance with various embodiments of the present invention.
Figure 8:
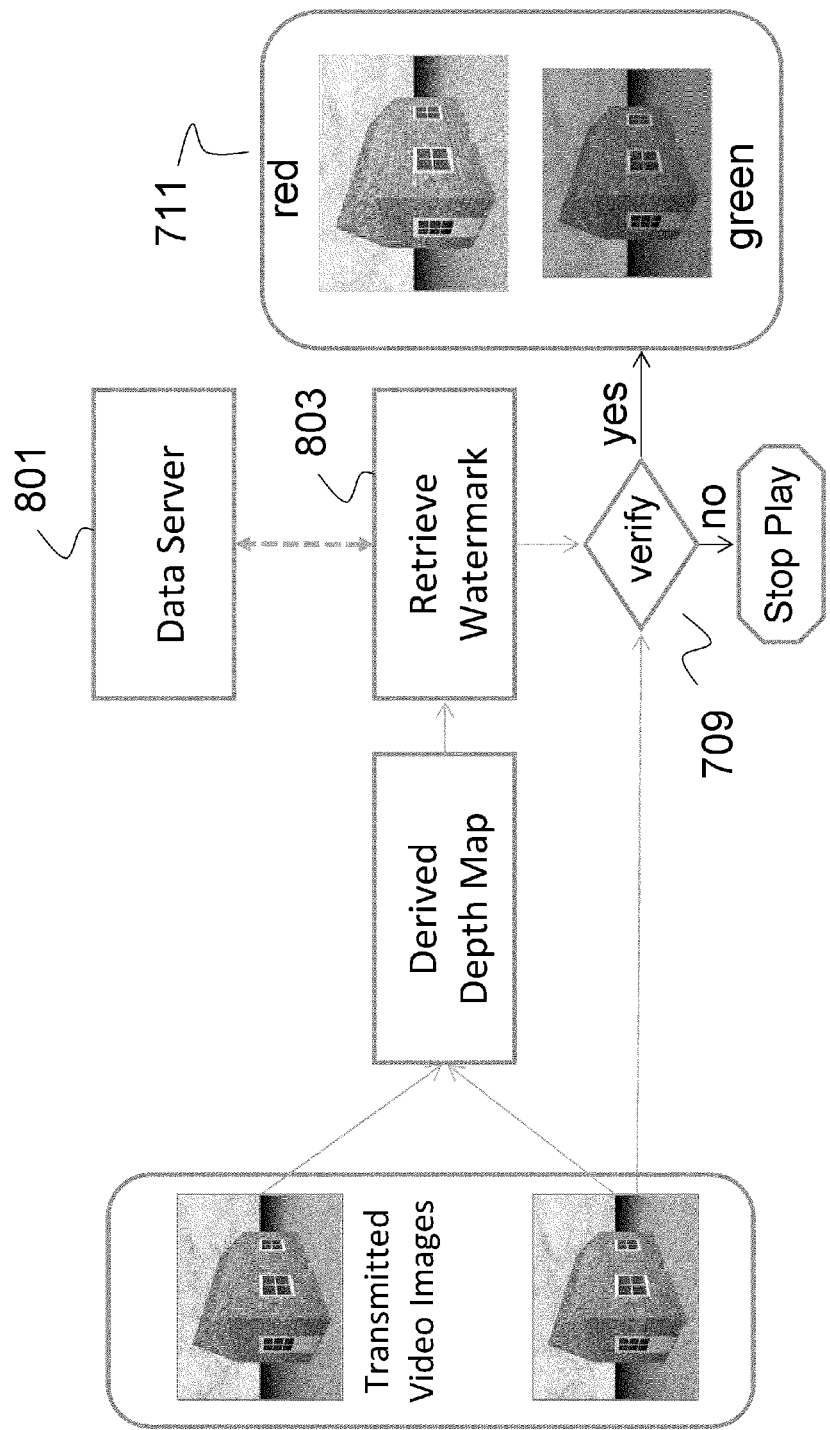
FIG. 8 is a flow chart illustrating another example verifying processing chain in accordance with various embodiments of the present invention.

FIGS. 7 and 8 illustrate the example uses of the decoded (or extracted) watermark information. In FIG. 7, in a retrieve watermark step 703, the watermark information transmitted along with the 3D video signal (e.g., the closed caption data 705) is retrieved. The retrieved watermark information is compared with the watermark information decoded from the derived depth map 707 in a verify step 709. If the decoded watermark information matches with the watermark information retrieved in step 703, the 3D video is played on a video play system 711 stereoscopically using, for example, red and green filters. If the decoded watermark information does not match with the watermark information retrieved in step 703, the 3D video is not played. In FIG. 8, the decoded watermark information is compared with the watermark information stored in an external source, such as a database, retrieved by a data server 801 in a retrieve watermark step 803. The retrieved watermark in these examples can also be used to verify the video content, provide ancillary information to the viewer (e.g., promotions, games, extras). The system could verify content by checking an encoded specific product identifier (e.g., serial number) versus the database specific product identifier.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore, it is intended that the invention not be limited to the particular embodiments for carrying out this invention, but that the invention will include all embodiments falling within the scope of the appended claims.

What is claimed is:

1. A method for decoding at least one watermark from a 3D pair of images that has been encoded with at least one watermark by shifting one or more pixels in one or more directions, comprising:
   generating a depth map from the 3D pair of images;
   decoding said at least one watermark from said depth map;
   modifying said depth map by removing said watermark information from the said depth map, and
   generating a modified set of three dimensional pair of images based on the modified depth map.

2. The method of claim 1, further comprising:
   receiving information regarding an encoding algorithm that encoded said at least one watermark into said 3D pair of images, and
   using a decoding algorithm based on said encoding algorithm.

3. The method of claim 1, further comprising:
   receiving a code from an external source;
   matching the code to the at least one watermark; and
   performing an action based on a result of the matching step.

4. A method for decoding at least one watermark from a 3D pair of images that has been encoded with at least one watermark by shifting one or more pixels in one or more directions, comprising:
   generating a depth map from the 3D pair of images;
   decoding said at least one watermark from said depth map;
   receiving a code from an external source;
   matching the code to the at least one watermark; and
   performing an action based on a result of the matching step, wherein the action is preventing the three dimensional video from being played when the result is a negative match.

5. A system for decoding at least one watermark from a 3D pair of images that has been encoded with at least one watermark by shifting one or more pixels in one or more directions, comprising:
   a generator configured to create a depth map from the 3D pair of images;
   a decoder configured to extract said at least one watermark from said depth map;
   a processor configured to
      modify said depth map by removing said
   watermark information from the said depth map, and
   generate a modified set of three dimensional pair of images based on the modified depth map.

6. The system of claim 5, further comprising:
   a receiver configured to obtain information regarding an encoding algorithm that encoded said at least one watermark into said 3D pair of images, said receiver further configured to decode based on said encoding algorithm.

7. The system of claim 5, further comprising:
- a retriever configured to receive a code from an external source and to match the code to the at least one watermark; and
- a means for performing an action based on a result of the matching step.

8. the system of claim 7, wherein the action is preventing the pair of images being displayed when the result is a negative match.

9. A system for decoding at least one watermark from a 3D pair of images that has been encoded with at least one watermark by shifting one or more pixels in one or more directions, comprising:
- a generator configured to create a depth map from the 3D pair of images;
- a decoder configured to extract said at least one watermark from said depth map;
- a retriever configured to receive a code from an external source and to match the code to the at least one watermark;
- a processor configured to perform an action based on a result of the matching step, wherein the action is preventing the pair of images being displayed when the result is a negative match.

\* \* \* \* \*